United States Patent [19]

Saeki et al.

[11] Patent Number: 5,829,804
[45] Date of Patent: Nov. 3, 1998

[54] RESIN COMPOSITION FOR USE IN THE MAKING OF AUTOMOBILE BUMPERS AND AUTOMOBILE BUMPERS MADE THEREOF

[75] Inventors: Yoshihisa Saeki; Kenji Hamabe, both of Saitama-ken; Kouzou Hayashi, Kanagawa-ken; Sachio Yokote, Kanagawa-ken; Hiromasa Marubayashi, Kanagawa-ken; Hiroyuki Toshino, Kanagawa-ken; Nobuhiro Imai, Kanagawa-ken; Masaya Akiyama, Kanagawa-ken, all of Japan

[73] Assignees: Mitsui Chemicals, Inc.; Honda Giken Kogyo Kabushiki Kaisha, both of Tokyo, Japan

[21] Appl. No.: 670,095

[22] Filed: Jun. 25, 1996

[30] Foreign Application Priority Data

Jun. 27, 1995 [JP] Japan ................................. 7-161195

[51] Int. Cl.$^6$ .................................................. B60R 19/03
[52] U.S. Cl. ........................... 293/120; 524/451; 524/505
[58] Field of Search ..................... 524/451, 505; 525/88, 89, 98; 293/120

[56] References Cited

U.S. PATENT DOCUMENTS

| | | | |
|---|---|---|---|
| 4,914,155 | 4/1990 | Shimomura et al. | 525/89 |
| 4,946,898 | 8/1990 | Kasahara et al. | 525/240 |
| 5,324,711 | 6/1994 | Nielsen et al. | 504/261 |
| 5,324,771 | 6/1994 | Suehiro et al. | 524/525 |
| 5,543,454 | 8/1996 | Kamakura et al. | 524/451 |

FOREIGN PATENT DOCUMENTS 53-64256  6/1978  Japan .

*Primary Examiner*—James J. Seidleck
*Assistant Examiner*—U. K. Rajguru
*Attorney, Agent, or Firm*—Burns, Doane, Swecker & Mathis, L.L.P.

[57] ABSTRACT

Disclosed is a resin composition for the making of automobile bumpers comprising specified amounts of (A) a specific propylene-ethylene block copolymer, (B) a specific propylene homopolymer, (C) (C1) an ethylene-propylene copolymer rubber (EPM) and/or (C2) an ethylene-propylene-diene copolymer rubber (EPDM), (D) talc, and optionally (E) a polyhydroxy polyolefin. This resin composition shows an improvement in flexural modulus of elasticity and low-temperature impact resistance and also has good processability by injection molding, especially in terms of planar smoothness. Moreover, when component (E) is added, this resin composition provides automobile bumpers having adequate coating adhesion and hence excellent paintability. Thus, this resin composition is highly suitable for use in the making of automobile bumpers.

20 Claims, No Drawings

RESIN COMPOSITION FOR USE IN THE MAKING OF AUTOMOBILE BUMPERS AND AUTOMOBILE BUMPERS MADE THEREOF

BACKGROUND OF THE INVENTION

1. Field of the Invention

This invention relates to a resin composition for the making of automobile bumpers which, when viewed in terms of physical properties, is excellent in rigidity and low-temperature impact resistance and hence suitable for use in the making of automobile bumpers and, when viewed in terms of processability by injection molding, gives excellent surface quality (e.g., little surface distortion), and to automobile bumpers made thereof.

This invention also relates to a novel resin composition for the making of automobile bumpers which can yield molded articles having excellent paintability in that a sufficient coating adhesion can be achieved even when the surfaces of the molded articles are painted without subjecting them to a degreasing cleaning treatment with a halogen-containing organic solvent or the like and by baking the paint film at lower temperatures.

2. Description of the Prior Art

From the viewpoint of weight saving, safety and the like, conventional automobile bumpers made of iron are being replaced by bumpers made of polyurethane or bumpers made of a propylene-ethylene block copolymer adding an ethylene-propylene copolymer rubber incorporated therein.

However, polyurethane bumpers are economically disadvantageous because they are expensive and have a relatively high specific gravity. Polypropylene bumpers are relatively cheap, but have poor in rigidity, low-temperature impact resistance and heat distortion temperature. The problem of insufficient rigidity and low-temperature impact resistance has been solved by increasing the wall thickness of molded bumpers, but this is contradictory to the purposes of weight saving and economization.

In order to solve the problem of insufficiency in rigidity and other properties, the addition of inorganic fillers such as calcium carbonate, barium sulfate, mica, crystalline calcium silicate or talc has been proposed, for example, in Japanese Patent Laid-Open No. 64256/'78. However, the addition of inorganic fillers may cause a reduction in impact resistance and processability, and hence requires a further improvement.

Moreover, it is known that polypropylene resin is essentially nonpolar and hence has poor paintability. For example, when automobile bumpers made of conventional conposite polypropylene are to be painted so as to achieve a sufficient adhesion strength of the coating, it has been necessary to subject the surfaces of the bumpers to a degreasing cleaning treatment with a halogen-containing organic solvent such as 1,1,1-trichloroethane, and then to primer undercoating or plasma treatment prior to overcoating, or bake the paint film at a temperature of as high as about 120° C.

A process eliminating the degreasing cleaning treatment with a halogen-containing organic solvent such as 1,1,1-trichloroethane is disclosed in U.S. Pat. No. 5,324,771. However, a further improvement in balance between the rigidity and impact resistance of the resin composition is still desired.

SUMMARY OF THE INVENTION

In view of these circumstances, the present invention has been made with a view to developing a resin composition for the making of automobile bumpers which comprises specific crystalline polypropylene resins, used as main components, an ethylene-propylene copolymer rubber (EPM) and/or an ethylene-propylene-diene copolymer rubber (EPDM), and talc, achieves the low-temperature impact strength and rigidity required of a resinous material for the making of automobile bumpers when viewed in terms of physical properties, and can reduce the wall thickness of automobile bumpers.

It is an object of the present invention to provide a resin composition suitable for use in the making of automobile bumpers which can reduce the wall thickness of automobile bumpers owing its high rigidity (i.e., its high flexural modulus of elasticity) and, moreover, has high impact resistance.

It is another object of the present invention to provide a resin composition for the making of automobile bumpers which, when viewed in terms of processability by injection molding, can reduce the wall thickness of automobile bumpers owing its good fluidity, has a short molding cycle, and gives good surface quality.

In another embodiment of the present invention, it is a further object thereof to provide a resin composition for the making of automobile bumpers which, in addition to the above-described features, can yield molded articles having excellent paintability in that a sufficient coating adhesion can be achieved by baking the paint film at lower temperatures without requiring the degreasing cleaning treatment of the surfaces of the molded articles with a halogen-containing organic solvent.

The present inventors have made intensive investigations on the development of a polypropylene resin composition having excellent rigidity and low-temperature impact resistance and, moreover, a resin composition having excellent paintability in addition to the aforesaid features. As a result, the present invention has now been completed.

Thus, according to the present invention, there is provided a resin composition for the making of automobile bumpers comprising (A) a propylene-ethylene block copolymer composed of a homopolypropylene portion having an isotactic pentad fraction of 0.95 or greater as measured by $^{13}$C-NMR and an intrinsic viscosity of 0.6 to 1.2 dl/g, and a propylene-ethylene copolymer portion having a propylene/ethylene weight ratio of 75/25 to 25/75 and an intrinsic viscosity of 3.0 to 11.0 dl/g, (B) a propylene homopolymer having an isotactic pentad fraction of 0.95 or greater as measured by $^{13}$C-NMR and an intrinsic viscosity of 1.3 to 4.0 dl/g, (C) (C1) an ethylene-propylene copolymer rubber (EPM) having a Mooney viscosity ($ML_{1+4}$(100° C.)) of 20 to 120 and a propylene content of 15 to 60% by weight, and/or (C2) an ethylene-propylene-diene copolymer rubber (EPDM) having an iodine value of 5 to 30 and a Mooney viscosity ($ML_{1+4}$(100° C.)) of 10 to 50, and (D) talc having an average particle diameter of 0.5 to 5 μm, wherein, when the amount (in parts by weight) of the propylene-ethylene copolymer portion of the propylene-ethylene block copolymer (A) is represented by (α) (provided that the combined amount of components (A) and (B) is 100 parts by weight), the amounts of components (A) to (D) and the value of (α) satisfy the following expressions:

$$(A)+(B)=100 \text{ (parts by weight)} \qquad (I)$$

$$0.2 \leq (B)/((A)+(B)) \text{ (weight ratio)} \leq 0.6 \qquad (II)$$

$$25 \text{ (parts by weight)} \leq (C) \leq 80 \text{ (parts by weight)} \qquad (III)$$

$$0.06 < (\alpha)/((\alpha)+(C)) \text{ (weight ratio)} \leq 0.5 \quad \text{(IV)}$$

$$0.6 \text{ (part by weight)} \leq (D) \leq 30 \text{ (parts by weight)} \quad \text{(V)}$$

DETAILED DESCRIPTION OF THE PREFERRED EMBODIMENTS

Moreover, the present invention also provides a resin composition for the making of automobile bumpers as described above which further comprises (E) a polyhydroxy polyolefin having a hydroxyl value (KOH mg/g) of 20 to 100 in order to impart excellent paintability thereto, the polyhydroxy polyolefin (E) being added in such an amount, per 100 parts by weight of the combination of components (A) and (B), as to satisfy the following expression:

$$0.6 \text{ (part by weight)} \leq (E) \leq 20 \text{ (parts by weight)} \quad \text{(VI)}$$

Furthermore, the present invention also provides a resin composition for the making of automobile bumpers as described above wherein the EPDM (C2)/EPM (C1) weight ratio in component (C) is in the range of 0.05 to 1.5.

In addition, the present invention also provides automobile bumpers made by molding resin compositions for the making of automobile bumpers as described above.

The propylene-ethylene block copolymer (A) is composed of a homopolypropylene portion comprising a homopolymer of propylene, and a propylene-ethylene copolymer portion.

The homopolypropylene portion of the aforesaid propylene-ethylene block copolymer (A) should have an isotactic pentad fraction (hereinafter referred to briefly as "pentad fraction") of 0.95 or greater as measured by $^{13}$C-NMR and an intrinsic viscosity (as measured in a tetralin solution at 135° C.) of 0.6 to 1.2 dl/g and preferably 0.8 to 1.0 dl/g.

When the intrinsic viscosity is 0.6 or greater, the resulting resin composition has excellent mechanical properties such as such as rigidity and low-temperature impact resistance, and when it is 1.2 or less, the resulting resin composition has good fluidity.

When the homopolypropylene portion is highly crystalline as indicated by an isotactic pentad fraction of 0.95 or greater, preferably 0.965 or greater, and more preferably 0.97 or greater, the resulting resin composition shows a good balance between rigidity and impact resistance. Accordingly, the isotactic pentad fraction of the homopolypropylene portion should preferably be as high as possible.

Moreover, the weight ratio of propylene to ethylene copolymerized in the copolymer portion should be in the range of 75/25 to 25/75 and preferably in the range of 60/40 to 40/60. When the weight ratio is in this range, the resulting resin composition is excellent in low-temperature impact strength and flexural modulus of elasticity.

The copolymer portion of component (A) should have a relatively high molecular weight as indicated by an intrinsic viscosity of 3.0 to 11.0 dl/g and preferably 3.5 to 10.0 dl/g. When the intrinsic viscosity is 3.0 dl/g or greater, the resulting resin composition has good low-temperature impact resistance. However, if it is greater than 11.0 dl/g, the resin composition shows poor dispersibility and the resulting resin composition fails to have good impact strength.

The melt flow index (hereinafter referred to briefly as "MFR") of component (A) is preferably in the range of 10 to 150 g/10 min. and more preferably in the range of 25 to 100 g/10 min. When the MFR is 10 g/10 min. or greater, the resulting resin composition has high fluidity and hence good moldability, and when it is 150 g/10 min. or less, the resulting resin composition develops no defects (e.g., burrs) during molding and also has good low-temperature impact strength.

Furthermore, component (A) preferably has an ethylene content of 1.5 to 25.0% by weight. In particular, an ethylene content of 3.5 to 15.0% by weight is preferred from the viewpoint of processability and impact resistance.

The propylene homopolymer (B) is a polymer of propylene alone. It should have an intrinsic viscosity of 1.3 to 4.0 dl/g, and an intrinsic viscosity of 1.4 to 3.0 dl/g is preferred from the viewpoint of balance between rigidity and impact resistance. When the intrinsic viscosity is 1.3 dl/g or greater, the resulting resin composition shows a good balance between rigidity and low-temperature impact resistance. However, if it is greater than 4.0 dl/g, the injection-molded articles have a poor appearance.

Moreover, the propylene homopolymer (B) should be highly crystalline as indicated by a pentad fraction of 0.95 or greater, preferably 0.965 or greater, and more preferably 0.97 or greater as measured by $^{13}$C-NMR, because the resulting resin composition shows a good balance between rigidity and low-temperature impact resistance. Accordingly, its pentad fraction should preferably be as high as possible.

The amount of propylene homopolymer (B) used is such that the (B)/((A)+(B)) weight ratio is in the range of 0.2 to 0.6 and preferably in the range of 0.2 to 0.4, more preferably in the range of 0.3 to 0.4. When the weight ratio is 0.2 or greater, the resulting resin composition has satisfactorily high fluidity and good low-temperature impact resistance, and when it is 0.6 or less, the resulting resin composition has good low-temperature impact resistance and retains high fluidity.

The propylene-ethylene block copolymer (A) and the propylene homopolymer (B), which are used in the present invention, can be prepared according to any of well-known techniques in common use. The polymerization may be carried out either in continuous operation or in batch operation. Examples of the usable techniques include slurry polymerization using an inert hydrocarbon solvent such as butane, pentane, hexane, heptane or octane, bulk polymerization using a liquefied monomer or monomers in the absence of solvent, and vapor-phase polymerization.

The polymerization catalyst used for this purpose preferably comprises a stereospecific catalyst. Typical examples of this catalyst include catalysts composed of a titanium trichloride composition and an organoaluminum compound (i.e., titanium trichloride catalysts), particularly catalysts composed of a titanium trichloride composition obtained by reducing titanium tetrachloride with an organoaluminum compound and further treating it various electron donors (e.g., a dialkyl ether) and electron acceptors (e.g, a titanium tetrachloride), an organoaluminum compound and an electron-donating compound (e.g., an aromatic carboxylic acid ester), as well as supported catalyst systems composed of a supported catalytic component obtained by bringing titanium tetrachloride and various electron donors (e.g., an aromatic (di)carboxylic acid ester)into contact with a magnesium halide, an organoaluminum compound and an electron-donating compound. However, other stereospecific catalysts may also be used.

The polymerization can be carried out in a temperature range of 0° to 300° C. However, in the stereospecific polymerization of α-olefins such as propylene, polymers having high stereoregularity cannot be obtained at temperatures higher than 100° C. For this reason or other, it is usually suitable to carry out the polymerization in a temperature range of 0° to 100° C. Although no particular limitation is placed on the polymerization pressure, it is desirable from an industrial and economical point of view to use a pressure ranging from atmospheric pressure to about 100 atmospheres. It is also possible to add a chain transfer agent such as hydrogen for the purpose of controlling the molecular weight of the polymer.

When a titanium trichloride catalyst is used as the catalyst system for the preparation of the propylene homopolymer and/or the preparation of the propylene-ethylene block copolymer, especially for the preparation of the propylene-ethylene block copolymer, the resin composition of the present invention is particularly excellent in rigidity. On the other hand, when a supported catalyst system is used, the resin composition of the present invention is particularly excellent in impact resistance. Accordingly, the catalyst used for polymerization may be suitably selected according to the intended purpose.

The ethylene-propylene copolymer rubber (EPM) (C1) used in the present invention should have a Mooney viscosity ($ML_{1+4}(100°$ C.)) of 20 to 120 and preferably 40 to 80. Moreover, it should have a propylene content of 15 to 60% by weight and preferably 20 to 50% by weight. When the Mooney viscosity is 20 or greater, the resulting resin composition has excellent mechanical properties such as low-temperature impact resistance, and when it is 120 or less, the properties of the rubber are so good that its blending with other raw materials such as polypropylene suffers no interference. When the propylene content is 15% by weight or greater, the resulting resin composition has good mechanical properties such as low-temperature impact resistance, and when it is 60% by weight or less, the properties of the rubber are so good that no blocking occurs and its blending with other raw materials such as polypropylene suffers no interference.

The ethylene-propylene-diene copolymer rubber (EPDM) (C2) used in the present invention is a terpolymer of ethylene, propylene and a diene. The diene constituent preferably comprises ethylidenenorbornene and/or dicyclopentadiene, and the content of the diene constituent is defined by an iodine value of 5 to 30, preferably 10 to 30, and more preferably 15 to 25. Moreover, it should preferably have a a Mooney viscosity ($ML_{1+4}(100°$ C.)) of 10 to 50 and more preferably 20 to 45. When the iodine value is 5 or greater, the resulting resin composition shows an improvement in paintability, and when it is 30 or less, the properties of the rubber are so good that no blocking occurs and its blending with other raw materials such as polypropylene suffers no interference. When the Mooney viscosity is 10 or greater, the resulting resin composition has excellent mechanical properties such as low-temperature impact resistance, and when it is 50 or less, the rubber produces no adverse effect such as blocking.

The propylene content of component (C2) should be in the range of 15 to 60% by weight and preferably in the range of 20 to 50% by weight.

Where it is desired to make unpainted molded articles in the practice of the present invention, EPM (C1) alone may be used and the addition of EPDM (C2) is not needed. However, where the molded articles are to be painted, their paintability is improved by the combined use of EPM (C1) and EPDM (C2). In this case, the EPM (C1)/EPDM (C2) weight ratio is preferably in the range of 0.05 to 1.5 and more preferably in the range of 0.2 to 1.0. When the weight ratio is 0.05 or greater, a paintability-improving effect is recognized, and when it is 1.5 or less, the resulting resin composition retains good low-temperature impact resistance. Moreover, the Mooney viscosity of EPDM (C2) is preferably lower than that of EPM (C1) by 5 to 50 because this results in good paintability.

When the amount (in parts by weight) of the copolymer portion in component (A) is represented by (α) (provided that the combined amount of components (A) and (B) is 100 parts by weight), the (α)/((α)+(C)) ratio should preferably be in the range of 0.06 to 0.5 and more preferably in the range of 0.1 to 0.3. If the weight ratio is less than 0.06, the resulting resin composition may have poor low-temperature impact resistance.

The talc (D) used in the present invention should have an average particle diameter of 0.5 to 5 μm and preferably 0.7 to 2.0 μm. If the average particle diameter is greater than 5 μm, the resulting resin composition tends to have low impact resistance, while if it is less than 0.5 μm, the resulting resin composition tends to have an insufficient flexural modulus of elasticity. Such talc may be prepared, for example, by dry grinding and dry classification of raw talc.

The amount of talc (D) used is preferably in the range of 0.6 to 30 parts by weight per 100 parts by weight of the combination of components (A) and (B). If the amount of talc (D) used is greater than 30 parts by weight, the resulting resin composition has an unduly high specific gravity in opposition to the purpose of weight saving and, moreover, the molded articles tend to show welds. If it is less than 0.6 part by weight, the resulting resin composition may fail to have sufficient rigidity for the purpose of the present invention.

By molding the resin composition of the present invention, there are obtained molded articles which are improved in flexural modulus of elasticity and low-temperature impact resistance and exhibit good properties even at smaller wall thicknesses as compared with conventional materials.

The mechanism by which a resin composition for the making of automobile bumpers having excellent rigidity and low-temperature impact resistance can be obtained according to the present invention is believed to be as follows.

It is generally recognized that, in the balance between the rigidity and low-temperature impact resistance of a resin composition obtained by the combination of a propylene-ethylene block copolymer and a subsequently added ethylenic copolymer rubber or rubbers (i.e., EPM and/or EPDM), the dispersed state of the rubber formed during copolymerization of the propylene-ethylene block copolymer and the subsequently added ethylenic copolymer rubber(s) plays an important role.

When kneaded by using the same kneading machine and the same kneading conditions (i.e., temperature and screw speed), a composition comprising a propylene homopolymer, a propylene-ethylene block copolymer and an ethylenic copolymer rubber(s) contains dispersed rubber particles having a smaller diameter, as compared with an analogous composition containing no propylene homopolymer. As a result, the former composition shows an improvement in impact resistance and paintability.

Moreover, the composition of the present invention contains a large amount of an ethylenic copolymer rubber or rubbers and hence exhibits a unique effect which is not observed with a composition obtained simply by adding a propylene homopolymer to a propylene-ethylene block copolymer.

When the molded articles need to be painted, a hydroxy polyolefin (E) is preferably used in the resin composition for the making of automobile bumpers in accordance with the present invention.

Where the molded articles need to be painted in the practice of the present invention, component (E) is preferably added in an amount of 0.6 to 20 parts by weight, more preferably 1.0 to 5 parts by weight, per 100 parts by weight of the combination of components (A) and (B).

The hydroxy polyolefin (E) is a hydroxyl-terminated low-molecular-weight polyolefin having a molecular weight of 1,000 to 5,000. This hydroxy polyolefin can be prepared, for example, by polymerizing a conjugated diene monomer according to a well-known technique (e.g., anionic polymerization technique), hydrolyzing the product, and hydrogenating the resulting polymer. A specific example thereof is one manufactured and sold by Mitsubishi Chemical Co. under the trade name of Polytail-H.

The hydroxy polyolefin used in the present invention should preferably have a hydroxyl value (KOH mg/g) of 20 to 100. When the hydroxyl value is 20 or greater, the resulting resin composition provides good coating adhesion. However, if is greater than 100, the hydroxy polyolefin has poor compatibility with resins, resulting in low coating adhesion.

Beside the above-described components, other additional components may be added to the resin composition of the present invention to such an extent as not to detract from the effects of the present invention significantly. Such additional components include various additives which are commonly used in thermoplastic resin compositions. For example, processability stabilizers, antioxidants, ultraviolet absorbers, various soaps (such as metallic soaps), antistatic agents, pigments and pigment dispersants may be added to the resin composition of the present invention.

Moreover, whiskers such as fibrous potassium titanate, fibrous magnesium sulfates and fibrous aluminum borate, and carbon fibers may also be added thereto as required.

The resin compositions of the present invention may be prepared by kneading various components according to any conventional kneading technique. However, they are preferably prepared by means of a twin-screw extruder. No particular limitation is placed on the technique for molding the resin compositions of the present invention. Although injection molding and blow molding may be employed, the most suitable technique is injection molding.

Automobile bumpers made by molding the resin compositions of the present invention may be painted according to the process described in U.S. Pat. No. 5,324,771. Specifically, this process comprises the steps of molding a polypropylene resin composition, subjecting the surfaces of the resulting molded article to primer coating or plasma treatment without pretreatment with a halogen-containing organic solvent, and then subjecting the surfaces to overcoating. In this painting process, the molded article may be subjected to a degreasing cleaning treatment with a liquid other than halogen-containing organic solvents, if necessary. The term "liquid other than halogen-containing organic solvents" as used herein comprehends lower alcohols such as isopropyl alcohol, aqueous alkaline or acid solutions containing a surface-active agent, and the like.

In this painting process, the primer for undercoating use may comprise, for example, a commercially available acrylic-chlorinated polypropylene primer. This primer may be prepared according to the directions of its manual and then applied to a film thickness, for example, of about 10 $\mu$m.

In painting automobile bumpers in the practice of the present invention, various types of coating compositions including two-pack type urethane paints, one-pack type alkyd-melamine paints and one-pack type acrylic paints may be used as overcoatings. However, the resin compositions of the present invention are significantly effective in improving coating adhesion especially when molded pieces are coated with a low-temperature (e.g., 80° C.) setting urethane paint and evaluated by a gasohol resistance test and an X-sheped cross hatch mark test.

As described above, the present invention provides resin compositions for the making of automobile bumpers which show an improvement in flexural modulus of elasticity and low-temperature impact resistance and, moreover, have good processability by injection molding, especially in terms of planar smoothness. When the resin compositions for the making of automobile bumpers in accordance with the present invention are used, automobile bumpers having a smaller wall thickness can be made as compared with the use of conventional composite polypropylene resin compositions. In another embodiment of the present invention, there are provided resin compositions for the making of automobile bumpers which not only retain the above-described features but also have excellent paintability in that a sufficient coating adhesion can be achieved by baking the paint film at lower temperatures without requiring the degreasing cleaning treatment of their surfaces with a halogen-containing organic solvent. Thus, these resin compositions are highly suitable for the making of high-grade automobile bumpers having good surface smoothness and hence an attractive appearance.

The present invention is further illustrated by the following examples. However, these examples are not to be construed to limit the scope of the invention.

In the following examples and comparative examples, various raw materials were compounded according to various formulations. Moreover, as additives, 0.05 part by weight of 2,6-di-t-butyl-p-methylphenol, 0.05 part by weight of tetrakis[methylene-3-(3', 5'-di-t-butyl-4'-hydroxyplienyl)-propionate]methane, 0.1 part by weight of calcium stearate and 1.0 part by weight of carbon black were added to 100 parts by weight of the combination of components (A), (B), (C) and (D). These mixtures were blended in a Henschel mixer for 5 minutes, kneaded at 210° C. in a twin-screw extruder, and then granulated to obtain composite polypropylene resin compositions. Thereafter, using an injection molding machine having a clamping force of 100 tons, these compositions were molded at 220° C. to prepare various specimens for the evaluation of properties.

In the present invention, various properties were evaluated according to the following procedures.

(1) Intrinsic viscosity

A propylene-ethylene block copolymer or propylene homopolymer to be tested was completely dissolved in tetralin (containing 0.05% by weight of 2,6-di-t-butyl-p-methylphenol) at 135° C. Using an Ubbelohde viscometer, the viscosities of solutions having various concentrations in the range of 0.1 to 0.5 g/dl were measured. Then, a reduced viscosity was obtained by extrapolation to the zero concentration.

(2) Isotactic pentad fraction as measured by $^{13}$C NMR

The fraction of propylene monomer which constitutes a series of five isotactically joined propylene units was measured by $^{13}$C NMR. Using a Fourier-transform NMR spectrometer having a resonance frequency of 400 MHz (in the measurement of protons), about 30,000 integrated measurements were made at a frequency of 100 MHz. The assignment of spectra and the determination of pentad fractions were made according to the method of A. Zambelli [Macromol., 6, 925 (1973)].

(3) Melt index (MFR)

According to ASTM-D1238, melt indexes (MFRs) were measured at 230° C. under a load of 2.16 kg.

(4) Flexural modulus of elasticity

According to ASTM-D790, flexural moduli of elasticity were measured at 23° C.

(5) Impact resistance

According to ASTM-D256, Izod impact values were measured at −20° C.

(6) Mooney viscosity

According to JIS K-6300, Mooney viscosities were measured at 100° C.

(7) Evaluation of paintability (Normal cross hatch mark test)

A specimen for use in this coating adhesion test was prepared as follows: An automobile bumper was made by injection molding at a clamping force of 2,500 tons. A flat piece was cut from the side part of the bumper, coated with a primer (manufactured and sold by Nippon Bee Chemical Co., Ltd. under the trade name of RB-150) to a film thickness of 10 $\mu$m, and dried at 80° C. for 40 minutes. Then, the primed surface was coated with a urethane-based metallic paint (manufactured and sold by. Nippon Bee Chemical Co., Ltd. under the trade name of R-212) and a urethane-based clear lacquer (manufactured and sold by Nippon Bee Chemical Co., Ltd. under the trade name of R-213) to film thicknesses of 20 $\mu$m and 3.0 $\mu$m, respectively, and dried at 80° C. for 30 minutes. Thereafter, the coated piece was allowed to stand at room temperature for 48 hours and used as a specimen.

Using a razor, the coating on the specimen was cut at intervals of 1 mm in longitudinal and transverse directions. Thus, a checkered pattern of 10×10(=100) squares was formed. A strip of cellophane adhesive tape was applied thereto under finger pressure and peeled off quickly at a peel angle of 45°. After this procedure was repeated twice, the number of the remaining squares was counted.

The results of the aforesaid test were rated as follows: The coating adhesion was judged to be "good" when 95 or more squares remained, and "best" when all (=100) squares remained.

(8) Evaluation of paintability (X-sharped cross hatch mark test)

A specimen was cut from the gate part of the bumper and coated in the same manner as described in (7). The coating on the specimen was obliquely cut at intervals of 1 mm in two orthogonal directions. Thus, an obliquely checkered pattern of 10×10(=100) squares was formed. Then, the coating adhesion was evaluated in the same manner as described in (7).

(9) Evaluation of paintability (gasohol resistance test)

A specimen measuring 80 mm ×30 mm was cut from the aforesaid painted piece so as to have an equal cross section. This specimen was immersed in gasohol (i.e., gasoline containing 10% by volume of ethyl alcohol), and the time required for the coating to show abnormalities (such as peeling off, formation of blisters and wrinkles or the like) was measured. The specimen was judged to be "good" when no abnormality was observed after immersion for 120 minutes.

Preparation of Various Polypropylenes (Preparation of propylene-ethylene block copolymers (1))

A 250-liter autoclave made of SUS was charged with 100 liters of heptane in a stream of nitrogen, and the gas phase of the autoclave was replaced by propylene. On the other hand, a catalyst composed of heptane, a supported titanium catalytic component (obtained by adding diethyl phthalate to magnesium chloride, grinding this mixture, heat-treating the ground product with titanium tetrachloride, and then washing the resulting product with heptane), triethylaluminum and cyclohexylmethyldimethoxysilane was prepared in a separate glass vessel and charged into the autoclave. Then, polymerization was carried out at a temperature of 75° C. and a propylene pressure of 5 kg/cm$^2$ for 4 hours. During this time, the partial pressure of hydrogen was controlled so that the resulting polypropylene would have an intrinsic viscosity ($[\eta]$) of about 0.9 dl/g.

Next, the propylene was purged, and the autoclave was evacuated with a vacuum pump to remove any residual propylene and hydrogen. Then, polymerization was carried out at a temperature of 55° C. and a pressure of 2 kg/cm$^2$ for 2 hours, during which time the partial pressures of ethylene (EL), propylene (PL) and hydrogen in the gas phase were controlled so that the copolymer portion of the resulting block copolymer would have an EL/PL weight ratio of 1 and an intrinsic viscosity ($[\eta]$) of about 7 dl/g. This polymerization was carried out with a view to achieving the result that the copolymer portion so formed would comprise about 15% by weight of the whole polymer. The results of polymerization are shown in Table 1 (PP-1). Moreover, PP-2 was obtained by varying the EL/PL ratio and the hydrogen concentration in the aforesaid copolymerization step. In either case, the isotactic pentad fraction of the homopolypropylene portion was 0.98.

(Preparation of a propylene-ethylene block copolymer (2))

PP-3 was prepared in the same manner as described in the preparation of propylene-ethylene block copolymers (1), except that a catalyst composed of the so-called Solvay catalyst (obtained by reducing titanium tetrachloride with diethylaluminum monochloride and activating the resulting titanium trichloride composition by treatment with diisoamyl ether and titanium tetrachloride), diethylaluminum monochloride and ethyl benzoate was used and the polymerization temperature for the homopolypropylene portion was changed to 70° C. The isotactic pentad fraction of the homopolypropylene portion was 0.98.

(Preparation of propylene homopolymers)

Polymers shown in Table 2 were prepared in substantially the same manner as described for the preparation of the homopolypropylene portion in the preparation of propylene-ethylene block copolymers (1) (PP-4 and PP-5) or the preparation of a propylene-ethylene block copolymer (2) (PP-6). The isotactic pentad fractions of PP-4, PP-5 and PP-6 were 0.98, 0.98 and 0.97, respectively.

Preparation of the Resin Compositions and it's evaluation.

Various raw materials shown in Tables 1 to 6 were compounded according to the respective formulations shown in Tables 7 to 9. Moreover, as additives, 0.05 part by weight of 2,6-di-t-butyl-p-methylphenol, 0.05 part by weight of tetrakis[methylene-3-(3', 5'-di-t-butyl-4'-hydroxyphenyl)-propionate]methane, 0.1 part by weight of calcium stearate and 1.0 part by weight of carbon black were added to 100 parts by weight of the compositions. These mixture were blended in a Henschel mixer for 5 minutes, kneaded at 210° C. in a twin-screw extruder, and then granulated to obtain composite polypropylene resin compositions. Thereafter, using an injection molding machine having a clamping force of 100 tons, these compositions were molded at 220° C. to prepare various specimens for the evaluatin (4) and (5), and their properties were evaluated according to the above-described procedures. The results thus obtained are shown in Tables 7 to 9. Table 9 shows the experimental results of comparative examples. Specifically, they include the experimental results obtained when no propylene homopolymer was added (Comparative Examples 1 and 2), when the propylene homopolymer had an unduly low intrinsic viscosity (Comparative Example 3), and when the copolymer portion of the block copolymer had an unduly low intrinsic viscosity (Comparative Example 4).

TABLE 1

Propylene-ethylene block copolymer

| Type | MFR (g/10 min.) | Ethylene content (wt. %) | Intrinsic viscosity of homopolymer portion (dl/g) | Content of copolymer portion (wt. %) | Intrinsic viscosity of copolymer portion (dl/g) |
|---|---|---|---|---|---|
| PP-1 | 27.0 | 7.5 | 0.89 | 14.7 | 6.3 |
| PP-2 | 29.2 | 8.0 | 0.94 | 15.1 | 2.3 |
| PP-3 | 29.5 | 7.4 | 0.91 | 14.4 | 6.8 |

TABLE 2

Propylene homopolymer

| Type | MFR (g/10 min.) | Intrinsic viscosity (dl/g) |
|---|---|---|
| PP-4 | 11.3 | 1.50 |
| PP-5 | 62.1 | 1.0 |
| PP-6 | 12.0 | 1.48 |

TABLE 3

Ethylene-propylene copolymer rubber

| Type | $ML_{1+4}$(100° C.) | Propylene content (wt. %) |
|---|---|---|
| EPM-1 | 70 | 35 |
| EPM-2 | 40 | 35 |

TABLE 4

Ethylene-propylene-ethylidenenorbornene (ENB) copolymer rubber

| Type | $ML_{1+4}$(100° C.) | Iodine value | Propylene content (wt. %) |
|---|---|---|---|
| EPDM-1 | 35 | 20 | 25 |

TABLE 5

Polyhydroxy polyolefin (POPO)

| Type | Hydroxyl value (KOH mg/g) | Average molecular weight |
|---|---|---|
| POPO | 25 | 2,000 |

TABLE 6

Talc

| Type | Average particle diameter (mm) |
|---|---|
| Talc-1 | 1.5 |

TABLE 7

Formulations and properties

| | Unit | Example 1 | Example 2 | Example 3 | Example 4 |
|---|---|---|---|---|---|
| Block PP | parts by weight | PP-1 70 | PP-3 70 | PP-1 70 | PP-1 70 |
| Homo PP | parts by weight | PP-4 30 | PP-4 30 | PP-6 30 | PP-4 30 |
| EPM | parts by weight | EPM-1 46 | EPM-1 46 | EPM-1 46 | EPM-2 46 |
| EPDM | parts by weight | | | | |
| POPO | parts by weight | | | | |
| Talc | parts by weight | 7.7 | 7.7 | 7.7 | 7.7 |
| MFR | g/10 min. | 9.3 | 9.6 | 9.9 | 15.5 |
| Flexural modulus of elasticity | kg/cm² | 15,200 | 15,600 | 15,700 | 15,100 |
| Izod impact strength | kg cm/cm | 34 | 30 | 28 | 27 |
| Moldability (appearance) | | Good | Good | Good | Good |
| Paintability (normal cross hatch mark test) | | Good | Good | Good | Good |
| Paintability (X-shaped cross hatch mark test) | | Poor | Poor | Poor | Good |
| Paintability (gasohol resistance test) | | Poor | Poor | Poor | Poor |

Izod impact strengths were measured at −20° C.

TABLE 8

Formulations and properties

| | Unit | Example 5 | Example 6 | Example 7 | Example 8 |
|---|---|---|---|---|---|
| Block PP | parts by weight | PP-1 70 | PP-3 70 | PP-1 70 | PP-3 70 |
| Homo PP | parts by weight | PP-4 30 | PP-4 30 | PP-5 30 | PP-4 30 |
| EPM | parts by weight | EPM-1 29 | EPM-1 29 | EPM-2 29 | EPM-2 29 |
| EPDM | parts by weight | 14 | 14 | 14 | 14 |
| POPO | parts by weight | 3.1 | 3.1 | 3.1 | 3.1 |
| Talc | parts by | 7.7 | 7.7 | 7.7 | 7.7 |

TABLE 8-continued

Formulations and properties

| | Unit | Example 5 | Example 6 | Example 7 | Example 8 |
|---|---|---|---|---|---|
| MFR | weight g/10 min. | 12.3 | 12.4 | 17.9 | 17.9 |
| Flexural modulus of elasticity | kg/cm$^2$ | 14,900 | 15,300 | 14,900 | 15.200 |
| Izod impact strength | kg cm/cm | 28 | 27 | 25 | 25 |
| Moldability (appearance) | | Good | Good | Good | Good |
| Paintability (normal cross hatch mark test) | | Good | Good | Best | Best |
| Paintability (X-shaped cross hatch mark test) | | Good | Good | Best | Best |
| Paintability (gasohol resistance test) | | Good | Good | Good | Good |

Izod impact strengths were measured at −20° C.

TABLE 9

Formulations and properties

| | Unit | Comparative Example 1 | Comparative Example 2 | Comparative Example 3 | Comparative Example 4 |
|---|---|---|---|---|---|
| Block PP | parts by weight | PP-1 100 | PP-3 100 | PP-1 70 | PP-2 70 |
| Homo PP | parts by weight | | | PP-5 30 | PP-4 30 |
| EPM | parts by weight | EPM-1 46 | EPM-1 46 | EPM-1 46 | EPM-1 46 |
| EPDM | parts by weight | | | | |
| POPO | parts by weight | | | | |
| Talc | parts by weight | 7.7 | 7.7 | 7.7 | 7.7 |
| MFR | g/10 min. | 10.8 | 11.3 | 19.8 | 9.8 |
| Flexural modulus of elasticity | kg/cm$^2$ | 14,300 | 14,800 | 15.300 | 15,200 |
| Izod impact strength | kg cm/cm | 18 | 15 | 13 | 19 |
| Moldability (appearance) | | Good | Good | Good | Good |
| Paintability (normal cross hatch mark test) | | Poor | Poor | Poor | Good |
| Paintability (X-shaped cross hatch mark test) | | Poor | Poor | Poor | Poor |
| Paintability (gasohol resistance test) | | Poor | Poor | Poor | Poor |

Izod impact strengths were measured at −20° C.

What is claimed is:

1. A resin composition for the making of automobile bumpers comprising
   (A) a propylene-ethylene block copolymer composed of a homopolypropylene portion having an isotactic pentad fraction of 0.95 or greater as measured by $^{13}$C NMR and an intrinsic viscosity of 0.6 to 1.2 dl/g, and a propylene-ethylene copolymer portion having a propylene/ethylene weight ratio of 75/25 to 25/75 and an intrinsic viscosity of 3.0 to 11.0 dl/g,
   (B) a propylene homopolymer having an isotactic pentad fraction of 0.95 or greater as measured by $^{13}$C NMR and an intrinsic viscosity of 1.3 to 4.0 dl/g,
   (C) (C1) an ethylene-propylene copolymer rubber (EPM) having a Mooney viscosity (ML$_{1+4}$(100° C.)) of 20 to 120 and a propylene content of 15 to 60% by weight, and/or (C2) an ethylene-propylene-diene copolymer rubber (EPDM) having an iodine value of 5 to 30 and a Mooney viscosity [ML$_{1+4}$(100° C.)] of 10 to 50, and
   (D) talc having an average particle diameter of 0.5 to 5 μm, wherein, when the amount (in parts by weight) of the propylene-ethylene copolymer portion of the propylene-ethylene block copolymer (A) is represented by (α) (provided that the combined amount of components (A) and (B) is 100 parts by weight), the amounts of components (A) to (D) and the value of (α) satisfy the following expressions:

(A)+(B)=100 (parts by weight)    (I)

0.2 ≦(B)/((A)+(B)) (weight ratio)≦0.6    (II)

25 (parts by weight)≦(C)≦80 (parts by weight)    (III)

0.06 <(α)/((α)+(C)) (weight ratio)≦0.5    (IV)

0.6 (part by weight)≦(D)≦30 (parts by weight)    (V).

2. A resin composition for making of automobile bumpers as claimed in claim 1, wherein the value of (B)/((A)+(B)) satisfied the following expresion:

0.2≦(B)/((A)+(B)) (weight ratio)≦0.4.

3. A resin composition for the making of automobile bumpers as claimed in claim 1 wherein the value of α satisfies the following expression:

0.1≦(α)/((α)+(C)) (weight ratio)≦0.3    (VI).

4. A resin composition for the making of automobile bumpers as claimed in claim 1 wherein the propylene-ethylene block copolymer (A) has a melt index of 25 to 100 g/10 min.

5. A resin composition for the making of automobile bumpers as claimed in claim 1 wherein the homopolypropylene portion of the propylene-ethylene block copolymer (A) has an isotactic pentad fraction of 0.965 or greater.

6. A resin composition for the making of automobile bumpers as claimed in claim 1 wherein the homopolypropylene portion of the propylene-ethylene block copolymer (A) has an isotactic pentad fraction of 0.97 or greater.

7. A resin composition for the making of automobile bumpers as claimed in claim 1 wherein the homopolypropylene portion of the propylene-ethylene block copolymer (A) has an intrinsic viscosity of 0.8 to 1.0 dl/g.

8. A resin composition for the making of automobile bumpers as claimed in claim 1 wherein the propylene-ethylene block copolymer (A) has been prepared by use of a catalyst composed of a titanium trichloride composition obtained by reducing titanium tetrachloride with an organoaluminum compound and further treating it with various electron donors and electron acceptors, an organoaluminum compound and an electron-donating compound.

9. A resin composition for the making of automobile bumpers as claimed in claim 1 wherein the propylene-ethylene block copolymer (A) has been prepared by use of a supported catalyst system composed of a supported catalytic component obtained by bringing titanium tetrachloride and various electron donors into contact with a magnesium halide, an organoaluminum compound and an electron-donating compound.

10. A resin composition for the making of automobile bumpers as claimed in claim 1 wherein the propylene homopolymer (B) has an intrinsic viscosity of 1.4 to 3.0 dl/g.

11. A resin composition for the making of automobile bumpers as claimed in claim 1 wherein the propylene homopolymer (B) has been prepared by use of a catalyst composed of a titanium trichloride composition obtained by reducing titanium tetrachloride with an organoaluminum compound and further treating it with various electron donors and electron acceptors, an organoaluminum compound and an electron-donating compound.

12. A resin composition for the making of automobile bumpers as claimed in claim 1 wherein the propylene homopolymer (B) has been prepared by use of a supported catalyst system composed of a supported catalytic component obtained by bringing titanium tetrachloride and various electron donors into contact with a magnesium halide, an organoaluminum compound and an electron-donating compound.

13. A resin composition for the making of automobile bumpers as claimed in claim 1 wherein the EPDM (C2)/EPM (C1) weight ratio in component (C) is in the range of 0.05 to 1.5.

14. A resin composition for the making of automobile bumpers as claimed in claim 1 wherein the EPDM (C2)/EPM (C1) weight ratio in component (C) is in the range of 0.2 to 1.0.

15. A resin composition for the making of automobile bumpers as claimed in claim 1 which further comprises (E) a polyhydroxy polyolefin having a hydroxyl value (KOH mg/g) of 20 to 100 in order to impart excellent paintability thereto, the polyhydroxy polyolefin (E) being added in such an amount, per 100 parts by weight of the combination of components (A) and (B), as to satisfy the following expression:

$$0.6 \text{ (part by weight)} \leq (E) \leq 20 \text{ (parts by weight)} \tag{VII}$$

16. A resin composition for the making of automobile bumpers as claimed in claim 15 wherein the polyhydroxy polyolefin (E) is added in such an amount as to satisfy the following expression:

$$1.0 \text{ (part by weight)} \leq (E) \leq 5 \text{ (parts by weight)} \tag{VIII}$$

17. A resin composition for the making of automobile bumpers as claimed in claim 13 which further comprises (E) a polyhydroxy polyolefin having a hydroxyl value (KOH mg/g) of 20 to 100 in order to impart excellent paintability thereto, the polyhydroxy polyolefin (E) being added in such an amount, per 100 parts by weight of the combination of components (A) and (B), as to satisfy the following expression:

$$1.0 \text{ (part by weight)} \leq (E) \leq 5 \text{ (parts by weight)} \tag{VIII}$$

18. A resin composition for the making of automobile bumpers as claimed in claim 14 which further comprises (E) a polyhydroxy polyolefin having a hydroxyl value (KOH mg/g) of 20 to 100 in order to impart excellent paintability thereto, the polyhydroxy polyolefin (E) being added in such an amount, per 100 parts by weight of components (A) and (B), as to satisfy the following expression:

$$1.0 \text{ (part by weight)} \leq (E) \leq 5 \text{ (parts by weight)} \tag{VIII}$$

19. An automobile bumper made by injection-molding a resin composition for the making of automobile bumpers as claimed in claim 1.

20. An automobile bumper made by injection-molding a resin composition for the making of automobile bumpers as claimed in claim 15.

* * * * *